United States Patent
Viertel et al.

[11] Patent Number: 6,059,348
[45] Date of Patent: May 9, 2000

[54] SUN VISOR SHAFT

[75] Inventors: Lothar Viertel, Altforweiler, Germany; Patrick Welter, La Chambre, France

[73] Assignee: Becker Group Europe, GmbH, Wuppertal, Germany

[21] Appl. No.: 09/208,303

[22] Filed: Dec. 9, 1998

[30] Foreign Application Priority Data

Dec. 9, 1997 [DE] Germany ............................ 197 54 533

[51] Int. Cl.⁷ ................................................. B60J 3/00
[52] U.S. Cl. ................... 296/97.9; 296/97.1; 296/97.12; 296/97.13
[58] Field of Search ................ 296/97.1, 97.9, 296/97.12, 97.13; 16/325, 334, 342

[56] References Cited

U.S. PATENT DOCUMENTS

| | | | |
|---|---|---|---|
| 4,070,054 | 1/1978 | Cziptschirsch | 296/97 |
| 4,390,202 | 6/1983 | Flowerday et al. | |
| 4,417,761 | 11/1983 | Cziptschirsch et al. | 296/97 |
| 4,489,974 | 12/1984 | Warhol | 296/97 |
| 4,492,404 | 1/1985 | Marcus et al. | |
| 4,500,131 | 2/1985 | Fleming | |
| 4,681,363 | 7/1987 | Hemmeke et al. | |
| 4,785,500 | 11/1988 | Langridge | 296/97.12 |
| 4,824,160 | 4/1989 | Fleming | |
| 4,925,233 | 5/1990 | Clark | |
| 5,004,289 | 4/1991 | Lanser et al. | |
| 5,080,420 | 1/1992 | Hemmeke et al. | |
| 5,299,106 | 3/1994 | Buchheit et al. | 296/97.13 |
| 5,328,227 | 7/1994 | Pax, Jr. et al. | |
| 5,383,700 | 1/1995 | Agro et al. | |
| 5,486,033 | 1/1996 | Lecorvaisier et al. | 296/97.13 |
| 5,517,731 | 5/1996 | Spykerman | |
| 5,556,155 | 9/1996 | Welter | 296/97.12 |
| 5,767,198 | 6/1998 | Shimizu et al. | 525/133 |
| 5,866,256 | 2/1999 | Izumitani et al. | 428/401 |
| 5,871,252 | 2/1999 | Gute | 296/97.1 |

*Primary Examiner*—D. Glenn Dayoan
*Assistant Examiner*—Lori L. Coletta
*Attorney, Agent, or Firm*—Harness, Dickey & Pierce, P.L.C.

[57] ABSTRACT

A shaft (1) for vehicle sun visors which is predominantly plastic and includes a short shaft leg (2) as well as a long shaft leg (3). The short shaft leg (2) engages a pillow block attached to the vehicle body, and the long shaft leg (3) engages a bearing housing (13), which is supported by the sun body. The bearing housing carries a detent spring (14) which exerts a clamping force on a partial axial region of the long shaft leg (3). The long shaft leg (3) includes a plastic material with self-lubricating properties along an axial partial region which is in contact with the detent spring (14).

19 Claims, 2 Drawing Sheets

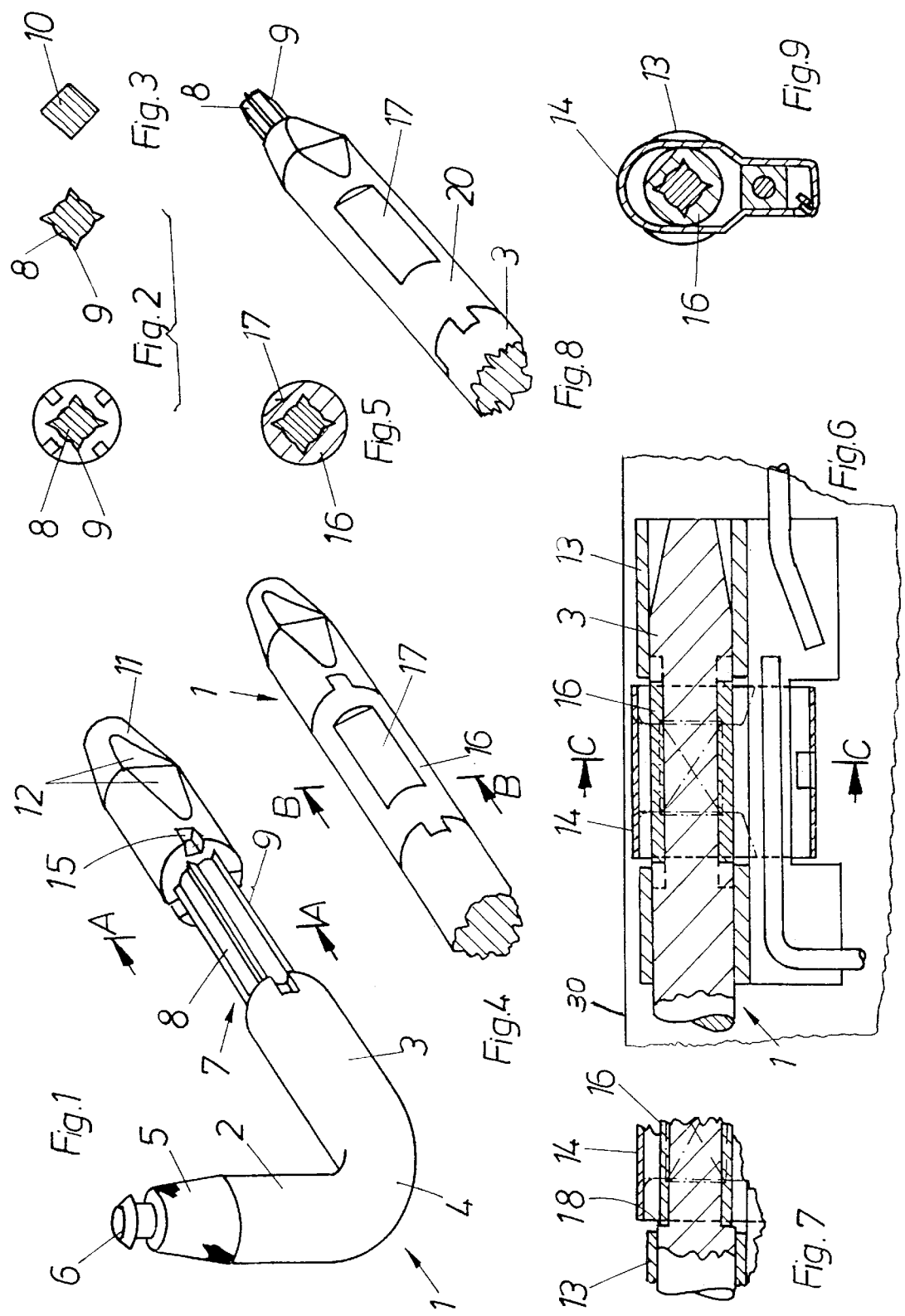

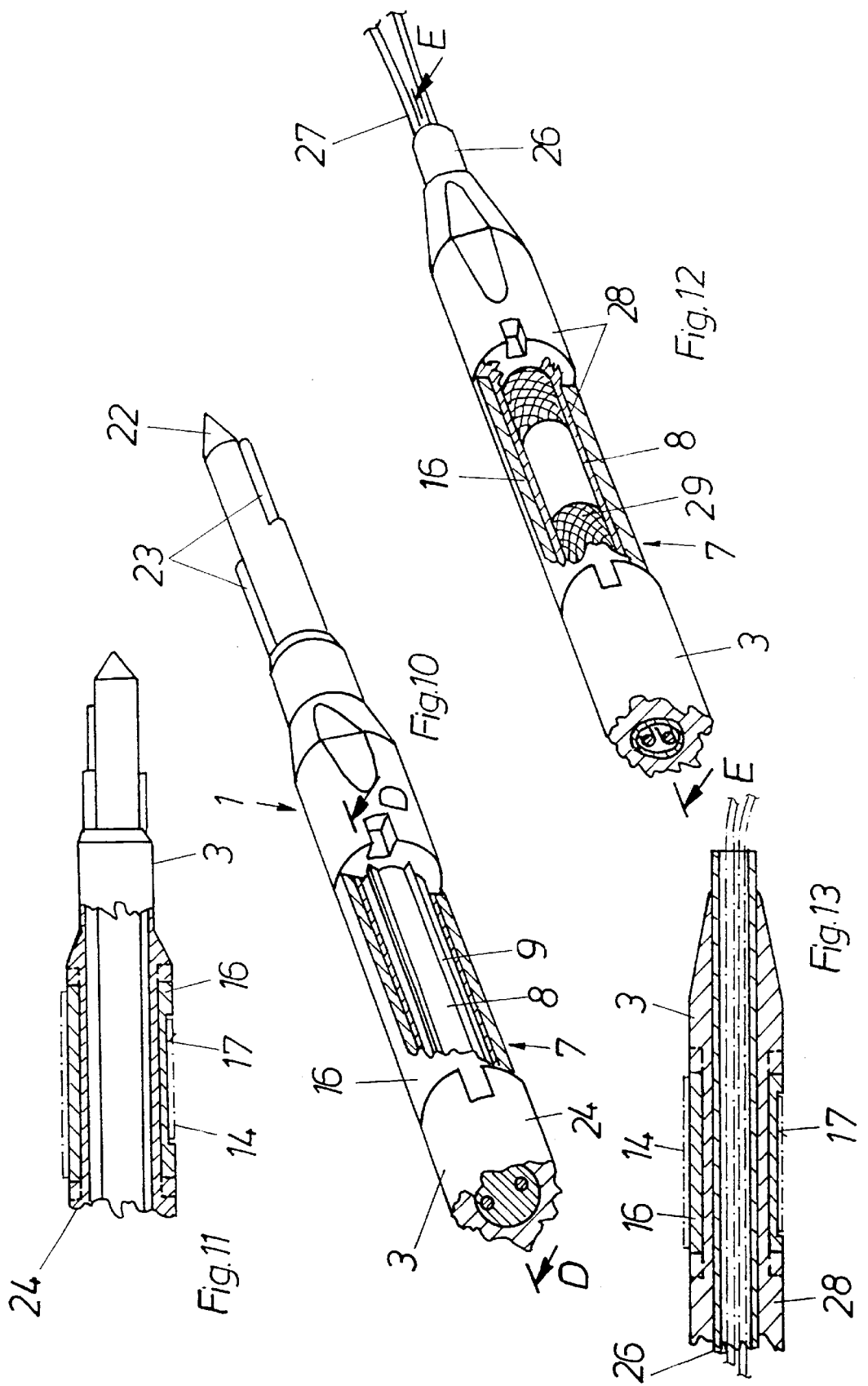

SUN VISOR SHAFT

BACKGROUND AND SUMMARY OF THE INVENTION

The present invention relates to a sun visor shaft and in particular to a sun visor shaft having an axial portion of the shaft formed by a plastic material with self-lubricating properties in contact with the sun visor detent spring.

For years the applicant has been working on the subject of a sun visor shaft with a greased bearing, but where the final objective of "no grease" has not yet been achieved until now. Greasing is required today in order to keep the annoying effect of squeaking (axle/spring are running dry) from occurring and to prevent the increase of the tilting torque in the case of extreme loads (tilting, heat, cold).

In the past, the most diverse experiments in the form of tests of the most varied types of grease, different surface qualities of the detent springs (by means of, for example, zinc-containing coating materials), as well as of a higher quality of finish on the surface of the shaft, were conducted. The combinations of tests did not result in a design that was free of grease, but merely in the discovery of improved types of grease in combination with an improvement of the surfaces of the spring and the shaft.

First of all, with respect to "greasing", it must be said that this constitutes a so-called "unclean" method of treatment, which is carried out with some reluctance. Furthermore, the application of grease does not constitute a process of satisfactory reliability, because in spite of the use of pneumatically or hydraulically operating greasing systems, air bubbles can occur in the grease and it can happen that no grease reaches the bearing or the detent spring. Furthermore, an important defective aspect has to be seen in the fact that grease residues can be present on the body of the sun visor, which, during the subsequent process, can cause invisible grease tracks to be present on the foil, which have later resulted in noticeable spots on the visible side of the sun visor body and have led to many complaints. In the case of electrical sun visors (a cable guided through a hollow shaft), the cables are coated with grease; this is bothersome and leads to the same defect as described earlier.

In the case of sun visors with electrical zones of contact at the shaft and the bearing, a not properly targeted or an excessive application of grease results in electrical contact problems, which has also led to a considerable number of complaints.

For example, in the case of visor bodies made of EPP, it has been shown during/after climate tests, that the grease migrates (through the material of the body), and thus comes in contact with the foil. For certain types of foils this leads to the formation of spots and distortions.

In summary, the above mentioned factors show that "greasing" constitutes a risk even though process and control methods are utilized.

It is an object of this invention to provide a solution, which makes it possible to dispense with the required greasing process in order to eliminate the above defects. Furthermore, the invention has the purpose of achieving distinction by virtue of less wear against steel (detent spring), less friction and slip-stick effect, lower moisture absorption, lower density (weight/cost savings), elimination of an additional lubrication process as well as the elimination of the risk of contamination by lubricants.

Dry friction is the main reason for wear. When materials come into contact with each other, the surfaces cling to each other, while fine particles are worn away from one of the two surfaces. Molten polymer, large grooves and furrows are indications of a high degree of wear and of the fact that the limit of pressure/velocity of the material has been exceeded.

In the case of, for example, a metal-thermoplastic pairing, the friction manifests itself by adhesion and deformation of the thermoplastic material. This dual effect has the result that the dynamic coefficient of friction is greater than the static coefficient of friction.

Different combinations or different surface properties of the frictional partners may influence the wear-frictional properties of thermoplastic materials. Also having an effect is the surface roughness of the metal as well as that of the thermoplastic material. In general the wear behavior depends on the surface hardness.

This invention relies on the use of thermoplastics with slip additives, which have better wear and frictional properties than unmodified thermoplastics. This makes the thermoplastic material ideal for the kind of use where self-lubrication, reliability, reduction of noise and wear are important.

For the sun visor shaft according to the invention, thermoplastics, in particular, which have been enriched with PTFE (polytetrafluoroethylene), should be considered, because these materials have a significantly lower wear factor and the lowest coefficient of friction. But also thermoplastics with silicon are advantageous, because they improve the wear properties and the frictional behavior to a large extent. Graphite powder (a highly temperature resistant solid with low friction), or molybdenum disulfide also could be used as an additional slip additive, while the latter, which is a solid, when added, for example to polyamide, reduces the wear factor. Furthermore, molybdenum disulfide transfers the lubricating property and provides a fine grain structure to the molded part.

The plastic material according to the invention, having self-lubricating properties, can also be enriched with reinforcing materials, such as glass fiber components, polymers or carbon fibers, aramide fibers or the like. Of all the reinforcing materials, aramide fibers offer the best lubricating effect and can reduce the wear factor of thermoplastics drastically (e.g. in combination with PTFE, the wear factor as well as the coefficient of friction are clearly lower).

Examples of embodiments of the invention will be explained below in more detail by reference to the drawings.

BRIEF DESCRIPTION OF THE DRAWINGS

FIG. 1 is a perspective view of a molded sun visor shaft in an intermediate step of manufacturing;

FIG. 2 is a section along a line A—A of FIG. 1 and a view as seen from the line A—A in FIG. 1;

FIG. 3 is an alternative embodiment of the section along the line A—A in FIG. 1;

FIG. 4 is a perspective view of an end portion of the sun visor shaft of FIG. 1 after complete manufacturing;

FIG. 5 is a section along the line B—B of FIG. 4;

FIG. 6 is a fragmentary side elevation view showing the sun visor bearing housing placed over the shaft of the present invention;

FIG. 7 is an elevation view like FIG. 6 showing an alternative embodiment of the sleeve of plastic material with self-lubricating properties;

FIG. 8 is a perspective view of an end portion of the sun visor shaft like FIG. 4 illustrating an alternative embodiment of the shaft;

FIG. 9 is section along the line C—C of FIG. 6;

FIGS. 10 and 11 illustrate an alternative embodiment of the sun visor shaft of the present invention having electrical contacts; and FIGS. 12 and 13 illustrative yet another alternative embodiment of the sun visor shaft of the present invention having a core with electrical cables there.

DETAILED DESCRIPTION OF THE PREFERRED EMBODIMENT

The sun visor shaft 1 in accordance with FIG. 1 is a plastic part molded from a thermoplastic with a reinforcing material (e.g. polyamide 6 with 30% GF [glass fibers]), where the form has been adapted to the requirements or installation conditions. The sun visor shaft 1 is formed by a shorter shaft leg 2 and a longer shaft leg 3, where a harmonic transition between the two shaft legs is achieved by means of a radius 4.

FIG. 1 represents the production of a so-called normal shaft in an intermediate manufacturing step as a molded part. In this case, the short cylindrical shaft leg 2 includes a cone-shaped addition 5 with a mushroom-shaped head 6 at its end. The long cylindrical shaft leg 3 contains a locally confined recess 7 with the formation of a core according to section A—A of FIG. 2, which is formed by a smaller cylindrical, circular cross-section 8 with wedge-shaped elevations or ribs 9, or alternatively it has, for example, a square shape 10 according to FIG. 3. At the end, the long shaft leg 3 in accordance with FIG. 1 includes a cone-shaped addition 11 with chamfers 12 located opposite each other, which chamfers are useful for the easier insertion of the bearing housing 13 in accordance with FIG. 6 and of the detent spring 14. The bearing housing 12 and the detent spring 14 are supported in a sun visor body 30 (FIG. 6.) In addition, at the circular circumference of the long shaft leg 3 there are, at both axial ends of the recess 7, according to FIG. 1, four each of the approximately rectangular recess enlargements 15.

The injection-molded part according to FIG. 1 can receive, in the same molding cavity in the region of its recess 7 a sleeve 16 consisting of a self-lubricating compound. In particular, the sleeve 16 is injection-molded around the molded part in accordance with FIG. 4 or section B—B of FIG. 5 with a detent surface 17 molded in place. The material is provided with a firm bond and protection against being twisted by, among other things, the wedge-shaped ribs 9 of the core cross-section 8 as well as by the recess enlargements 15 in accordance with FIG. 5 or FIG. 4. Depending on need, the circular cross-section of the sleeve 16 can be congruent with that of the long shaft leg 3 according to FIG. 6 or it can include a step-like shoulder 18 according to FIG. 7 for the purpose of additional axial protection against sliding of the entire sun visor shaft 1.

A different production process can be set up in such a manner that first the sleeve 16, which is made of a self-lubricating plastic material, is injection-molded and inserted into the corresponding mold cavity of the sun visor shaft 1. The production of the sun visor shaft 1 is then completed by means of a subsequent injection-molding process. In this context it remains further to be mentioned that the molded shaft proper, e.g. according to the presentation in FIG. 1 or 8, on the basis of good experiences in its production and use, consists of a thermoplastic with a glass fiber component.

FIG. 8 shows, beyond this, an alternative design with regard to the construction of the shaft leg 3, to which an addition, which is elongated at its end and has a smaller cylindrical cross-section 8 with, for example, wedge-shaped ribs 9 and an elongated sheath 20 made of a self-lubricating plastic material. The production process can likewise be carried out as mentioned above.

Section C—C of FIG. 9 shows in a cross-sectional view the combination of the mounted spring detent 14 in the bearing housing 13 in contact with the sleeve 16 or the elongated sheath 20 made of the previously mentioned thermoplastic with a slip agent (self-lubricating compound), and here it should be mentioned that the spring detent 14 may have received an additional surface treatment as a measure against the effects of corrosion.

In addition, further examples of the embodiments of illuminated visor designs are presented in FIGS. 10 and 11. These contain a locally placed thermoplastic with lubricants and are to be produced with the same manufacturing technique as the previously described sun visor shafts, and they only differ by virtue of their systems allowing them to be electrified.

The sun visor shaft 1 according to FIG. 10 consists of a pre-fabricated core 22 with integrated contacts 23 which, as shown, are exposed at their ends. The core 22 is placed inside the corresponding mold-cavity for the shaft and it is molded by injecting thermoplastic 24, which is glass-fiber reinforced, around it, during which process, for example, the locally confined recess 7 with the smaller circular cross-section 8 of its, for example, wedge-shaped ribs 9 receives a sleeve 16 at its end with a detent surface 17 of self-lubricating compound according to section D—D of FIG. 11. Instead of the local recess 7 it can be extended in or over the entire end region as shown in FIG. 8, however, dimensionally it needs to be made as in FIGS. 10, 11.

The sun visor shaft 1 according to FIG. 12 includes a tube 26, which constitutes its core and serves as a channel for the introduction of, for example, two sheathed cables 27. The tube 26 is placed in the corresponding mold cavity for the shaft and thermoplastic 28, which is reinforced by glass fibers, is injected around it, with, for example, a locally confined recess 7 and a smaller circular cross-section 8, while a knurl 29 on the tube 26 results in protection against twisting or in a firm seat, respectively. Subsequently, the addition of the sleeve 16 of self-lubricating plastic according to FIG. 13, section E—E takes place.

It is to be understood that the invention is not limited to the exact construction illustrated and described above, but the various changes and modifications may be made without departing from the spirit and scope of the invention as defined in the following claims.

What is claimed is:

1. A shaft (1) for a vehicle sun visor which comprises a short shaft leg (2) and a long shaft leg (3) having a plastic body portion (16) including at least one flat portion (17), where the long shaft leg (3) engages a bearing housing (13), which is supported in the sun visor body (30), the bearing housing carrying a detent spring (14), which interacts with said at least one flat portion (17) of said plastic body portion (16) and exerts a clamping force on a partial axial region of the long shaft leg (3), wherein the long shaft leg (3) includes a plastic material with self-lubricating properties along the axial partial region which is in contact with the detent spring (14).

2. The sun visor shaft according to claim 1, characterized in that the sun visor shaft (1) includes a recess (7), which extends along an axial partial region of the long shaft leg (3), which is filled by a plastic body with self-lubricating properties.

3. The sun visor shaft according to claim 2, characterized in that the plastic body is made in the form of a sleeve (16) with self-lubricating properties.

4. The sun visor shaft according to claim 2, characterized in that in the region of the recess (7) of the sun visor shaft (1), ribs (9) are formed for anchoring the plastic body (16) having self-lubricating properties.

5. The sun visor shaft according to claim 2, characterized in that in the region of the recess (7) of the sun visor shaft (1), recess enlargements (15) are formed for anchoring the plastic body (16) having self-lubricating properties.

6. The sun visor shaft according to claim 2, characterized in that the plastic body (16) having self-lubricating properties is molded in place at the long shaft leg (3) directly at the sun visor shaft (1) by means of injection around a portion of the long shaft leg (3).

7. The sun visor shaft according to claim 1 characterized in that the plastic material having self-lubricating properties consists of a thermoplastic enriched with a slip additive.

8. The sun visor shaft according to claim 1, characterized in that the plastic material is a thermoplastic enriched with at least one of the group consisting of polytetrafluoroethylene (PTFE), graphite powder, and molybdenum disulfide.

9. The sun visor shaft according to claim 1, characterized in that the plastic material is a thermoplastic enriched with slip additives and is enriched with additional reinforcing fiber selected from the group of glass fibers, carbon fibers and aramide fibers.

10. The sun visor shaft according to claim 1, characterized by the application of the plastic material with self-lubricating properties to the partial axial region of the long shaft leg (3) of the sun visor shaft (1), which comes into contact with the spring detent (14).

11. A shaft (1) for a vehicle sun visor which comprises a short shaft leg (2) and a long shaft leg (3) having a recess (7) with recess enlargements (15) anchoring a plastic body (16), wherein the long shaft leg (3) engages a bearing housing (13), which is supported in the sun visor body (30), the bearing housing carrying a detent spring (14), which exerts a clamping force on a partial axial region of the long shaft leg (3), wherein at least a portion of the long shaft leg (3) includes a plastic material with self-lubricating properties along the axial partial region which is in contact with the detent spring (14).

12. The sun visor shaft according to claim 11, characterized in that the recess (7) extends along an axial partial region of the long shaft leg (3) and the plastic body (16) includes a plastic material with self-lubricating properties.

13. The sun visor shaft according to claim 11, characterized in that the plastic body (16) has self-lubricating properties and includes at least one flat portion (17) which interacts with the spring detent (14).

14. The sun visor shaft according to claim 11, characterized in that the plastic material is a thermoplastic enriched with slip additives and is enriched with additional reinforcing fiber selected from the group of glass fibers, carbon fibers and aramide fibers.

15. A shaft (1) for a vehicle sun visor which comprises a short shaft leg (2) and a long shaft leg (3), a portion of the shaft leg (3) filled with a plastic body (16) having at least one flat portion (17) which interacts with a detent spring (14), wherein the long shaft leg (3) engages a bearing housing (13), which is supported in the sun visor body (30), the bearing housing carrying the detent spring (14), which exerts a clamping force on a partial axial region of the long shaft leg (3), wherein at least a portion of the long shaft leg (3) includes a plastic material with self-lubricating properties along the axial partial region which is in contact with the detent spring (14).

16. The sun visor shaft according to claim 15, characterized in that the sun visor shaft (1) includes a recess (7), which extends along an axial partial region of the long shaft leg (3), which is filled by the plastic body (16), the plastic body (16) having self-lubricating properties.

17. The sun visor shaft according to claim 16, characterized in that in the region of the recess (7) of the sun visor shaft (1), recess enlargements (15) are formed for anchoring the plastic body (16) having self-lubricating properties.

18. The sun visor shaft according to claim 15, characterized in that the plastic material having self-lubricating properties consists of a thermoplastic enriched with a slip additive.

19. The sun visor shaft according to claim 15, characterized in that the plastic material is a thermoplastic enriched with at least one of the group consisting of polytetrafluoroethylene (PTFE), graphite powder, and molybdenum disulfide.

* * * * *